United States Patent Office 3,437,529
Patented Apr. 8, 1969

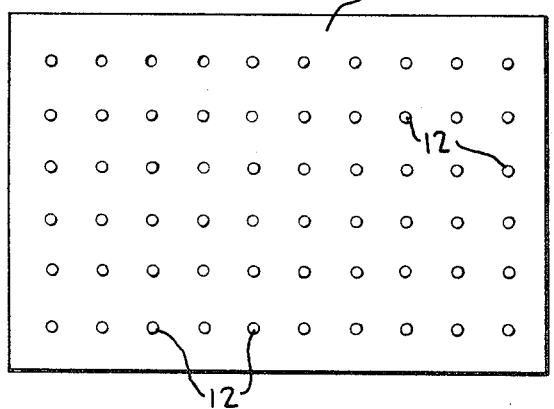
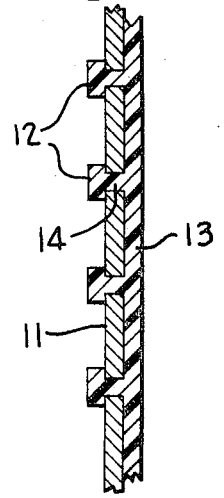
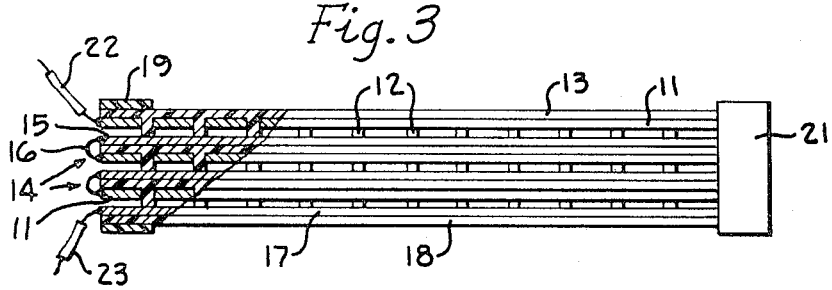
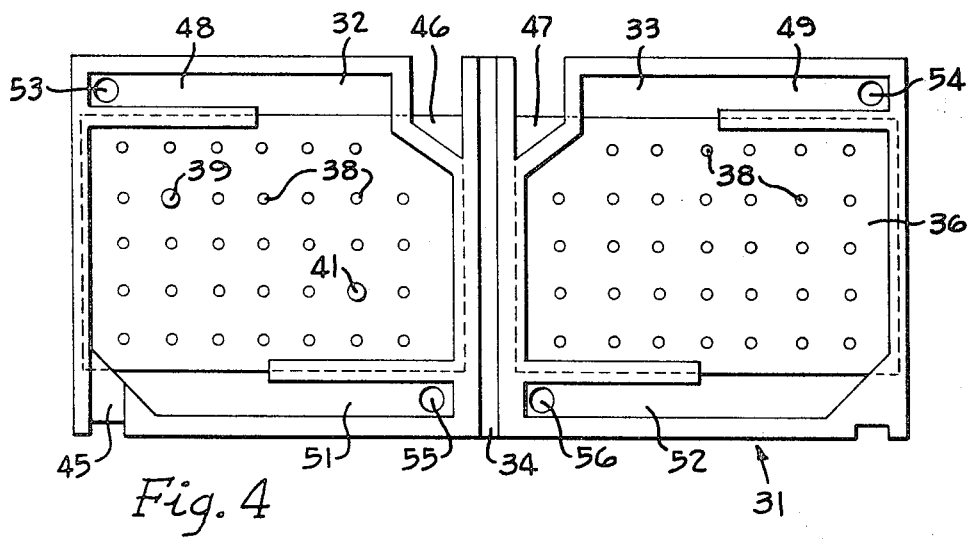

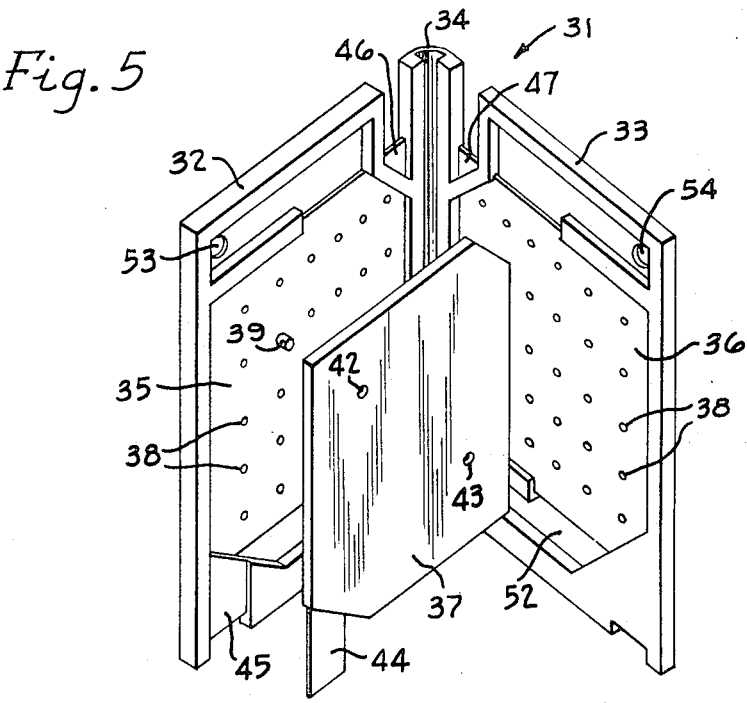
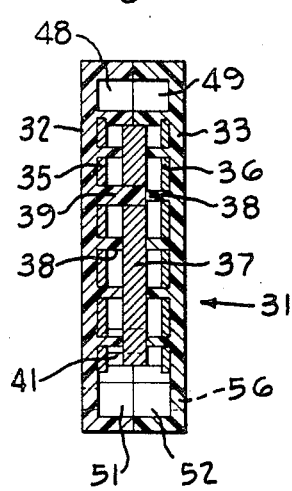
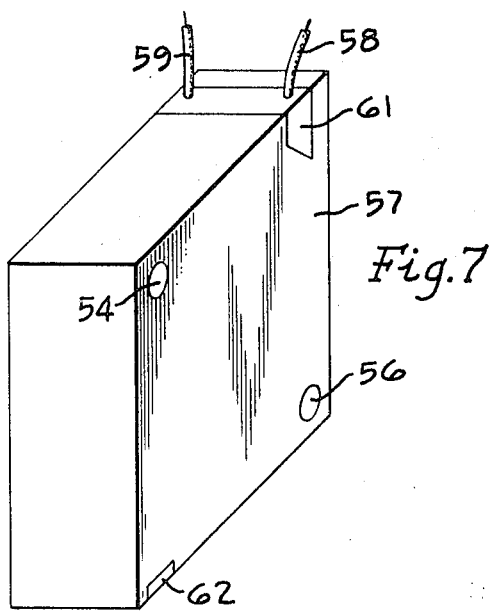

3,437,529
BATTERY ELECTRODE-SEPARATOR ASSEMBLY
Harold N. Honer, Wonewoc, Wis., assignor, by mesne assignments, to ESB Incorporated, Philadelphia, Pa., a corporation of Delaware
Filed July 26, 1966, Ser. No. 567,949
Int. Cl. H01m *17/06, 13/06*
U.S. Cl. 136—100                                                   12 Claims This invention generally relates to reserve type electric batteries which are adapted to be activated by immersion in a suitable electrolyte such as sea water. More specifically, it is concerned with an electrode-separator assembly for batteries of this type.

In order to sustain high current density in water-activated batteries which are designed for submerged discharge, it is necessary to separate electrodes of opposite polarity so as to provide a substantially unobstructed space between them for the entry and flow of water. This spacing must be achieved in such a manner so as to prevent contact between the electrodes when the battery is subjected to shock and vibration. Several constructions have been used to achieve proper electrode spacing, but none of these have proven to be entirely satisfactory. In one construction, sheets of non-woven, loosely matted fibers are used to separate the electrodes; but these have been found to interfere with the entry and circulation of electrolyte, thus delaying battery activation and limiting the discharge rate. In other constructions, glass beads or plastic filaments are placed between the electrodes. While these readily permit the entry and flow of electrolyte between the electrodes, they are difficult to place and handle and substantially increase the cost of battery manufacture.

A specific object of the present invention is to provide new and improved electrode separation means for water-activated batteries which will permit close and precise spacing between electrodes but which will not obstruct the entry and flow of water between the electrodes.

Another object of the present invention is to provide this improved separation by means of a construction which is rugged and insensitive to shock.

Still another object of the present invention is to provide this improved separation by means of a construction which is inexpensive to manufacture and which lends itself to mass production methods.

A further object of the present invention is to provide a new and improved electrode separation means for batteries of the type described which will also provide an intercell barrier between adjacent battery cells.

A still further object of the present invention is to provide electrode separation means for batteries of the type described which, in addition to providing an intercell barrier, can also provide a means for encapsulating the individual battery cells.

The foregoing objects of the present invention are achieved in a construction in which insulating spacers are provided on one surface of an electrode by forcing a suitable insulating material such as polyethylene or other thermoplastic resin through perforations in the electrode. The diameter, shape and spacing of these spacers can be varied by varying the diameter, shape and locations of the perforations. The distance the spacers extend beyond the surface of the electrode and hence spacings between adjacent electrodes can be controlled by controlling the distance the insulating material is forced through the perforations. Sufficient insulating material is used so as to provide a layer of it on the reverse side of the electrode after formation of the spacers. This layer can be utilized as an intercell barrier for the assembly of the electrodes in series to form a multi-cell battery. If desired, this layer of insulating material can extend beyond the edges of the electrode and be used to partially or completely encapsulate the individual cells.

A better understanding of the present invention may be had from the following description when read with reference to the accompanying drawings of which:

FIG. 1 is a front elevation of one embodiment of an electrode-separator assembly of the present invention;

FIG. 2 is an enlarged, fragmentary cross-section of the embodiment of the present invention shown in FIG. 1;

FIG. 3 is a side elevation taken in partial section of a battery using electrode-separator assemblies of the type shown in FIG. 1;

FIG. 4 is a front elevation of another embodiment of the present invention, a cell sub-assembly;

FIG. 5 is a perspective view of a partially assembled cell utilizing a cell sub-assembly of the type shown in FIG. 4;

FIG. 6 is a sectional side elevation of a cell of the type shown in FIG. 5; and

FIG. 7 is a perspective view of a battery comprising cells of the type shown in FIGS. 5 and 6.

Referring now to FIGS. 1 and 2, the numeral 11 designates an electrode of the flat plate type used in sea water batteries. In accordance with the present invention, the electrode 11 has a plurality of insulating spacers 12 projecting from the surface thereof to separate the electrode 11 from an electrode of the opposite polarity. As best shown in FIG. 2, insulating spacers 12 are projections of a layer of insulating material 13 on the underside of the electrode 11. The insulating spacers 12 are formed by forcing part of the insulating material 13 through perforations 14 in the electrode 11. As shown, the insulating spacers 12 are slightly larger than the perforations 14 on the active side of the electrode 11 assuring that they will not pull out of the perforations 14.

In a sea water battery the negative electrode is generally a sheet of magnesium, and the positive electrode comprises either silver chloride or cuprous chloride. If the positive electrode material is in the form of either a fused silver chloride or fused cuprous chloride which can be cast into mechanically rigid sheet material, the electrode 11 can be either the positive or negative electrode. However, it is usually desirable that the metallic negative electrode be perforated for use in an electrode-separator assembly of the type shown in FIGS. 1 and 2. Thermoplastic resins such as polyethylene, polypropylene, polystyrene, polyvinyl chloride, polyvinyl acetate and nylon have been found suitable for use as the insulating material 13. Of these materials the polyolefins are preferred because of their hydrophobic nature which enhances the batteries resistance to humidity.

The insulating spacers 12 may be formed by forcing under heat and pressure a portion of the insulating material 13 through perforations in the electrode 11. By way of illustration, a magnesium plate 0.010 inch thick was perforated with circular holes 0.027 inch in diameter. The perforations were spaced in rows 0.172 inch apart. The electrode was then placed in a mold with the perforations in alignment with cavities having a depth of 0.025 inch to provide spacers of that height. In order to form the spacers with a "head," the diameters of the mold cavities were 0.002 inch larger than the diameters of the perforations in the magnesium sheet. The electrode 11 was then covered with a sheet of polyethylene 0.020 inch thick. The mold was then closed and heated to a temperature of 400° F. to plasticize the polyethylene and a pressure of 500 lbs. per square inch was applied. The mold was then water cooled and the finished electrode-separator assembly removed therefrom. The spacers formed by this operation had the dimensions of the mold cavities and the insulating layer of polyethylene on the opposite surface of the electrode was 0.015 inch thick.

It has been found that a material such as polyethylene can be molded to provide spacers extending distances of from 0.005 inch to 0.040 inch leaving a residual sheet of polyethylene on the opposite side of the electrode having thicknesses of between 0.018 inch and 0.010 inch depending upon the pressure and temperature utilized for the pressing operation. The diameter, shape and spacing of the insulating spacers can be varied by varying the diameter, shape and spacing of the perforations in the electrode and the characteristics of the mold cavities.

An electrode-separator assembly in accordance with the present invention is well suited for the formation of duplex electrode sub-assemblies in which the positive electrode of one cell and the negative electrode of the adjacent cell are assembled in a single unit. A plurality of such duplex electrode sub-assemblies may be then placed in stacked relationship to form a battery. In accordance with the present invention, the layer of insulating material 13 may form the electrolyte barrier between the electrodes of adjacent cells. Thus, if the electrode 11 is a negative electrode, a positive electrode may be cemented or otherwise affixed to the other side of the layer 13 and an electrical connection made between the two electrodes around the edge of the layer 13.

In FIG. 3, there is illustrated a battery formed by stacking together a plurality of duplex electrode assemblies made as described above. In this figure, similar reference characters have been employed to designate components corresponding to those already described. The battery of FIG. 4 utilizes two duplex electrodes, designated 14. Each of the duplex electrodes 14 comprises a negative electrode 11, having insulating spacers 12 projecting from the surface thereof, an insulating layer 13 on the reverse side of that electrode and a positive electrode 15 on the opposite side of the layer 13. An electrical connection 16 is made between the electrodes 11 and 15 around the layer 13. One of the end electrodes of the battery is an electrode-separator assembly as shown in FIGS. 1 and 2 with the layer 13 forming the end enclosure. The other end electrode is a single positive electrode 17 having a layer 18 of insulating material thereon to provide the other end enclosure. The elements shown are joined at their edges by their tapes 19 and 21. Terminals for the battery are the leads 22 and 23 connected to the outside negative and outside positive electrodes, respectively.

In addition to providing new and improved means for achieving electrode separation, the present invention can also provide the means for encapsulating the individual cells of the battery. Referring now to FIGS. 4, 5 and 6, the numeral 31 designates a cell sub-assembly comprising two electrode compartments 32 tnd 33 joined at their adjacent borders by a hinge 34. The electrode compartments 32 and 33 house electrodes 35 and 36, respectively, which are both of the same polarity, preferably magnesium electrodes. As best shown in FIGS. 5 and 6, the sub-assembly 31 is adapted to be folded at the hinge 34 to form an envelope around an electrode 37 of the opposite polarity from the electrodes 35 and 36 and preferably a silver chloride electrode. As shown, the electrodes 35 and 36 are each provided with a plurality of insulating spacers 38 which extend through perforations in those electrodes and space them from the electrode 37. To aid the cell assembly, the electrode compartment 32 has, in addition to the insulating spacers 38, a pair of locating pins 39 and 41 which extend beyond the insulating spacers 38 a distance equal to the thickness of the electrode 37. The electrode 37 has a pair of corresponding holes 42 and 43 adapted to receive the pins 39 and 41 and fix the position of the electrode 37 relative to the electrodes 35 and 36.

The electrode 37 has a flat, ribbon-like terminal lug 44. To accommodate the lug 44, the electrode compartment 32 has a recess 45 in its bottom border. The terminals for the electrodes 35 and 36 are provided by recessing the borders of the cell compartments 32 and 33 at the adjacent corners 46 and 47 so that the electrodes project through and beyond the cell compartments leaving them exposed for external connection. As shown, the borders of the electrode compartments 32 and 33 are extended upwards adjacent to the electrode terminals 46 and 47. As will be explained in more detail hereinafter, when the cells are assembled into batteries, these extensions will form a dam for a sealing compound. To permit the entry and flow of electrolyte through the cell to be formed from the sub-assembly 31, the cell compartments 32 and 33 have complementary electrolyte passages 48 and 49, and 51 and 52, respectively. The electrolyte passages 48, 49, 51 and 52 have electrolyte entry and exit ports 53, 54, 55 and 56, respectively.

The sub-assembly 31 may be made in the same manner as the electrode separator assembly of FIGS. 1 and 2, that is, by molding a suitable insulating material such as polyethylene or nylon under heat and pressure around the pre-perforated electrodes 35 and 36. The only difference in the manufacturing process is the more intricate mold required for a sub-assembly 31. Cell sub-assemblies of the type illustrated have been molded from stock sheets of polyethylene 0.02 inch thick in a suitable mold heated to a temperature of 400° F. under a pressure of 500 lbs. per square inch.

The sub-assembly 31 when closed around an electrode 37 forms a complete cell which can be sealed by the application of heat or a solvent along its edges. A cell thus formed has electrode terminals as diametrical opposite corners. A plurality of the cells of this type may be assembled into batteries by stacking them so that the terminals of adjacent cells are of opposite polarity. When the cells have been stacked in this manner, the flat terminals 44 may be folded over and connected between the terminals 46 and 47 of adjacent cells by welding, stapling, or the like. In FIG. 7, the numeral 57 illustrates a battery made in this manner. When so aligned, the inlet ports 53 and 54 of one cell will be adjacent to the exit ports 55 and 56 of the contiguous cell. The ports on the end cells will form the inlet and exit ports for the battery as a whole. When the cells have been aligned and interconnected, adjacent cells may be solvent or heat sealed together along the edges to form a unitary structure. The leads 58 and 59 may be connected to the positive electrode of one end cell and the negative electrode of the opposite end cell to provide battery terminals. The areas 61 and 62 adjacent to the interconnected cell and battery terminals may then be filled with a suitable potting compound such as epoxy resins, silicone sealants, or olefin copolymers such as ethylene-vinyl acetate copolymers, which will adhere to the material of the individual cell assemblies.

In considering the present invention, it should be noted that means have been provided for achieving close and precise spacing between electrodes with a construction which is not only rugged but one that lends itself to mass production methods. The diameter, shape, spacing and number of the insulating spacers can be varied without increasing the time or labor involved in the manufacture of the unit. In addition, the handling of the individual spacing means which characterizes certain prior art constructions has been eliminated without obstructing the entry and flow of electrolyte between the electrodes. Where desired, the individual spacing means projecting from the surface of an electrode may be of different geometrical configurations. For example, certain spacers may be larger than others to provide a means for absorbing lateral pressure applied to the cells.

The present invention also provides a means for encapsulating the individual cells of a reserve-type battery. These individual cell elements can in turn be sealed together to form a battery complete with container. Thus, individual cells can be tested at any time up to final battery enscapsulation. A battery so constructed is rugged, efficient and inexpensive to manufacture. While polyethylene has been utilized as the spacer and cell encapsulating material in the specific examples recited, it should be understood that other thermoplastic resins can be used provided they are stable in the electrolyte in which the battery is to be used. In addition, other modifications in the invention may be made without departing from the spirit of the claims which follow.

Having described this invention, that which is claimed as new is:

1. In a reserve battery adapted to be activated by immersion in a liquid electrolyte comprising in combination therewith a battery electrode-separator assembly comprising a plate-like electrode having a plurality of perforations therein, a layer of insulating material on one surface of said electrode, and a plurality of insulating spacers projecting from the other surface thereof, said spacers comprising material from said layer extending through the perforations in said electrode.

2. An electrode-separator assembly as specified in claim 1 wherein said spacers are formed with a head larger than the perforations in said electrode.

3. An electrode-separator assembly as specified in claim 1 wherein said electrode is a magnesium electrode.

4. An electrode-separator assembly as specified in claim 1 wherein said insulating material is thermoplastic resin.

5. A cell assembly for a reserve battery of the type adapted to be activated by immersion in a liquid electrolyte comprising, a sub-assembly comprising a pair of complementary electrode compartments formed of an insulating material and joined by a hinge, a pair of perforated electrodes both of the same polarity and each housed in a separate one of said compartments, the insulating material of said compartments projecting through the perforations in the electrode therein to form a plurality of spacers on the surface of said electrode, electrolyte ports in said compartments, and an electrode of the opposite polarity, said sub-assembly being folded at said hinge around said electrode of opposite polarity to form a cell container in which said electrodes are held in a spaced relationship by said spacers.

6. A cell assembly as specified in claim 5 wherein said pair of perforated electrodes are magnesium electrodes.

7. A cell assembly as specified in claim 3 wherein said electrode of the opposite polarity is a silver chloride electrode.

8. A cell assembly as specified in claim 5 wherein said insulating material is a thermoplastic resin.

9. A cell assembly as specified in claim 5 wherein said spacers on the surfaces of said pair of electrodes are formed with heads larger than the perforations in said electrodes.

10. A cell assembly as specified in claim 5 wherein said electrodes are flat plate electrodes and are spaced in a parallel relationship by said spacers.

11. A cell assembly as specified in claim 5 wherein one of said electrodes has at least one additional perforation which is larger than the perforations for said spacers and insulating material from the compartment housing which projects through this perforation beyond said spacers to provide a locating means for said electrode of the opposite polarity.

12. A reserve battery of the type adapted to be activated by immersion in water comprising, a plurality of cell assemblies each comprising a pair of complementary electrode compartments molded of a thermoplastic resin and joined by a hinge of the same material, a pair of perforated magnesium electrodes and each housed in a separate one of said compartments, a plurality of spacers on the surface of each of said electrodes, said spacers comprising the thermoplastic resin of said compartments which projects through the perforations in said electrodes, electrolyte ports in said compartments, and a silver chloride electrode, said sub-assembly being folded at said hinge around said silver chloride electrode and sealed at its edges to form a cell container in which said electrodes are spaced in parallel relationship by said spacers, said cell assemblies being arranged in a stacked relationship to each other and connected in series, said cell assemblies being sealed to each other at their edges to form a unitary structure.

References Cited

UNITED STATES PATENTS

| 2,688,581 | 9/1954 | Stubbs | 264—273 XR |
| 2,716,671 | 8/1955 | Dines | 136—90 |
| 3,279,951 | 10/1966 | Bowers et al. | 136—100 |

WINSTON A. DOUGLAS, *Primary Examiner.*

A. SKAPARS, *Assisant Examiner.*

U.S. Cl. X.R.

136—90, 120, 145; 264—273